United States Patent [19]
Kirchner et al.

[11] Patent Number: 5,377,598
[45] Date of Patent: Jan. 3, 1995

[54] DESKTOP MOUNTED SHELF WITH PIVOTING ARMS

[75] Inventors: Balthasar Kirchner, Eferding; Siegfried Schleicher, Buchkirchen, both of Austria

[73] Assignee: Firma Ernst Stadelmann Gesellschaft mbH, Eferding, Austria

[21] Appl. No.: 909,941

[22] Filed: Jul. 7, 1992

[30] Foreign Application Priority Data

Jul. 17, 1991 [EP] European Pat. Off. ........ 91890153.9

[51] Int. Cl.6 .......................... F16M 11/00; A47F 7/00
[52] U.S. Cl. ..................................... 108/97; 108/137; 248/918
[58] Field of Search ................. 108/6, 7, 42, 137, 139, 108/103, 143, 97, 2; 248/152, 176, 220, 639, 917–922; 312/208.1; 400/682, 691; 211/97

[56] References Cited
U.S. PATENT DOCUMENTS

| | | | |
|---|---|---|---|
| 1,409,525 | 3/1922 | Cox | 16/236 X |
| 3,920,276 | 11/1975 | Sparrow | 108/139 X |
| 4,307,672 | 12/1981 | Shikimi | 108/139 |
| 4,437,638 | 3/1984 | Scheibenpflug | 248/921 X |
| 4,500,134 | 2/1985 | Kaneko et al. | 108/137 X |
| 4,515,086 | 5/1985 | Kwiecinski et al. | 108/96 |
| 4,562,987 | 1/1986 | Leeds et al. | 248/918 X |
| 4,567,835 | 2/1986 | Reese et al. | 248/918 |
| 4,624,510 | 11/1986 | Jedziniak | 248/918 |
| 4,708,312 | 11/1987 | Rohr | 248/919 X |
| 4,863,124 | 9/1989 | Ball et al. | 108/42 X |
| 4,863,140 | 9/1989 | Schriner | 248/639 |
| 5,122,941 | 6/1992 | Gross et al. | 248/918 X |

FOREIGN PATENT DOCUMENTS 0230236 1/1987 European Pat. Off. .
0445331 9/1991 European Pat. Off. ............ 248/900

Primary Examiner—Clifford D. Crowder
Assistant Examiner—Ismael Izaguirre
Attorney, Agent, or Firm—Herbert Dubno

[57] ABSTRACT

A desktop mount comprises a shelf and at least two spacers for mounting said shelf on a support, e.g., on a desktop. To ensure that the desktop mount can support technical end electronic equipment which can conveniently be operated, each spacer consists of a swivel bracket, which comprises a bracket base, which is adapted to be secured to a desktop or other support, and a bracket arm, which is pirated to the bracket base and to the shelf on spaced apart vertical axes.

12 Claims, 3 Drawing Sheets

DESKTOP MOUNTED SHELF WITH PIVOTING ARMS

FIELD OF THE INVENTION

This invention relates to a desktop mount comprising a shelf and at least two spacers for mounting said shelf on a support, e.g., on a desktop.

BACKGROUND OF THE INVENTION

The significance of technical end electronic equipment in the operation of modern offices is steadily increasing. Such equipment comprises telephone sets, tele-fax sets, dictating appliances as well as computers, visual display units, printers and copiers. The surface area required to support such equipment is steadily increasing. For reasons of space economy and to save costs an increase of the degree to which the surface area which is available is occupied is desired. For this reason, desks are often provided with a so-called second working level, which is constituted by a supporting surface that is spaced above the desktop. Such a second working level may be provided by a desktop mount. A known desktop mounts consist of a fixed superstructure comprising a rear wall and side walls rising from the desktop, as well as horizontal partitions and top plates and serve mainly to support files, forms and writing utensils but are often unsuitable as supports for office appliances. Resides, such fixed superstructures do not permit an adjustment of the supporting surfaces which are available and do not permit an adjustment of the positions of the appliances which are supported thereon. For this reason the known desktop mounts cannot support the various trams of equipment in positions in which they can conveniently be taken or operated by hand and will also restrict the free surface area which is available on the working surface of the desktop.

Other means have been proposed for supporting specific individual appliances and may comprise pivoted holders, such as pivoted arms for supporting telephone sets. But such supporting means are not designed to support heavy appliances or a plurality of appliances and sufficient space for providing a large number of such individual supports for respective appliances is not available on the desktop.

SUMMARY OF THE INVENTION

It is an object of the invention to eliminate these disadvantages and to provide a desktop mount which is adjustable and adaptable and has a high load-carrying capacity and for this reason is most suitable for supporting technical and electronic equipment.

It is another object of the invention to provide for use on a desktop a shelf structure which affords advantages over the earlier shelf structures provides for desktop mounting.

SUMMARY OF THE INVENTION

These objects are accomplished in accordance with the invention in that each spacer consists of a swivel bracket, which comprises a bracket base, which is adapted to be secured to a desktop or other support, and a bracket arm, which is pirated to the bracket base and to the shelf on spaced apart vertical axes. At least one pair of such swivel brackets are provided in most cases and provide for the shelf a balanced, stable, and movable supporting structure, which permits a free adjustment of the shelf above the desktop. For this reason the shelf can be used to carry various appliances end utensils and in each case can be moved to the position in which the appliance carried by the shelf can be operated with the greatest convenience. A user can pull the shelf closer to himself or herself or can push it away as desired to the rear or laterally as desired. The freedom of movement or the shelf not only permits a convenient operation of the appliance or appliances placed on the shelf but also permits an essentially undisturbed utilization of the desktop proper. If a very large shelf is required for carrying a heavy load, three or more swivel brackets may be provided and in that case the bracket arms must have the same orientation and the shelf can be pivotally moved only parallel to itself.

If the bracket arms are provided with mounting heads, which comprise pivot bearings for a pivotal connection to the shelf on a common horizontal pivotal axis, it will be possible to adjust the shelf to an inclination desired for a given use.

To simplify the adjustment, the mounting heeds may be provided with adjusting means, which serve to adjust the shelf end comprise an adjusting screw, which is provided with self-locking screw threads meshing with a mating adjusting nut or similar means so that the shelf can conveniently and continuously be adjusted to a desired position and will tend to maintain its adjusted inclined position.

In a desirable embodiment of the invention the shelf consists of releasably interconnected shelf sections. In that case the size of the shelf may be selected in each case in dependence on the requirements and such a desktop mount may be assembled from a plurality of units. The shelf sections may be interconnected by plug-and-socket joints or by male and female screw threads or other coupling means which ensure a firm fixation and can easily be disconnected.

For retaining the shelf in an adjusted position, at least one swivel bracket is provided with braking means, by which the movement of the shelf can be restrained or prevented as desired.

If the shelf is adapted to be provided with handles, secondary supports, retaining means for items supported on the shelf, or other accessories, the field of application will further be increased and the manipulation will be facilitated and, not least, the space available for equipment will be increased.

The shelf may be provided with drawers and/or compartments so that small parts, descriptions and instructions for the appliances on the shelf can be accommodated close thereto as well as other office utensils, and this will not restrict the supporting surface.

To permit the desktop mount to be mounted, demounted or rearranged with a few manual operations, the bracket bases may be provided with clamping means, particularly screw clamps, which can be secured to the desktop. It will obviously also be possible to fix the bracket bases to the desk by screws and in case of need the bracket bases may consist of holders which can be fixed to a wall so that the desktop mount can he mounted on a wall near the desk rather than on the desk.

BRIEF DESCRIPTION OF THE DRAWING

The above and other objects, features, and advantages will become more readily apparent from the fol lowing description, reference being made to the accompanying drawing in which.

SPECIFIC DESCRIPTION

Figure 1:
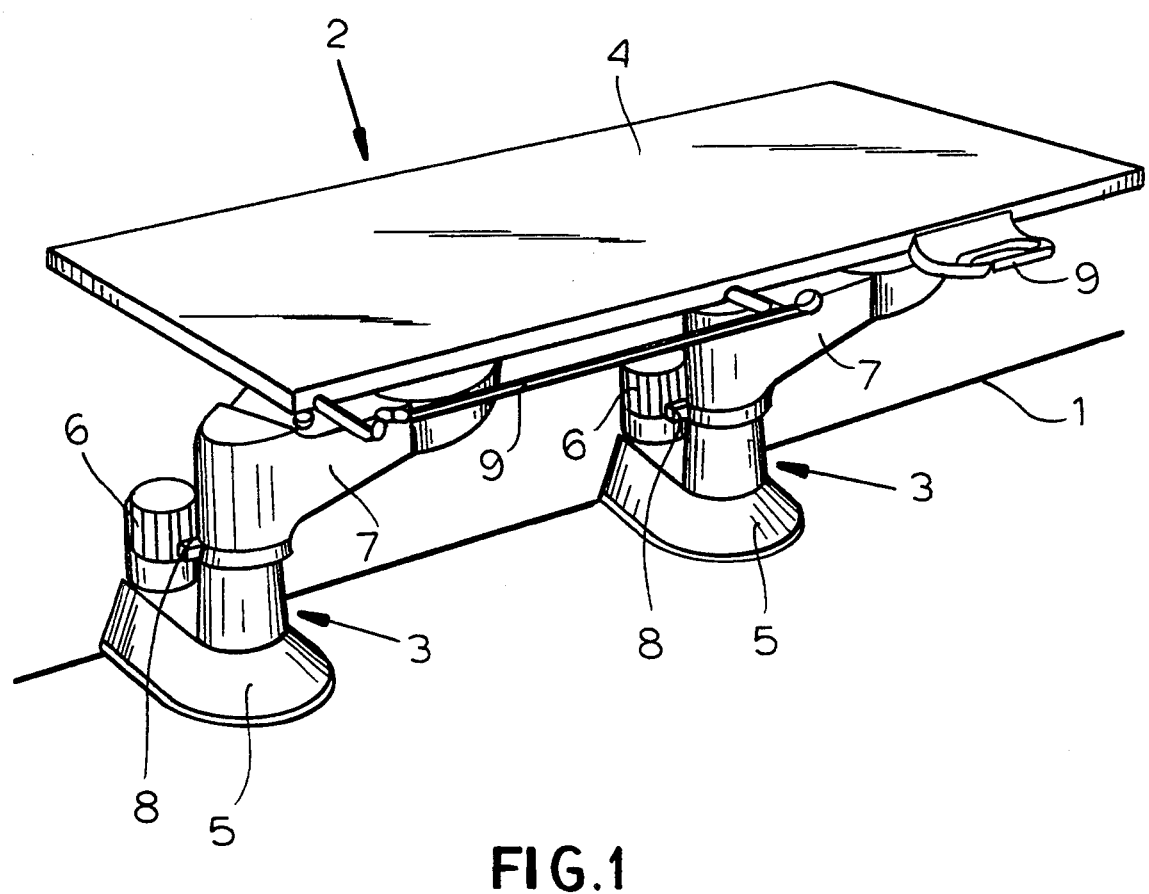
FIG. 1 is a perspective view of an embodiment of a desktop mount in accordance with the invention.

It is desired to provide adjacent to a desk 1 a convenient second working level mainly for supporting technical and electronic office appliances. This is accomplished by a desktop or wall mount 2, which comprises a shelf 4, which by two swivel brackets 3 is supported on the desk 1 or on an adjacent well. Each swivel bracket 3 comprises a bracket base 5, which is provided with a screw clamp 6 adapted to be detachably secured to the desktop, or a holder 6a (FIG. 2) adapted to be secured to a wall, and also comprises a bracket arm 7 for supporting a shelf 4. The bracket arm 7 is pivoted on spaced apart vertical axes V to the bracket base 5 and to the shelf 4 so that the shelf 4 can be displaced end pivotally moved in various directions and to various positions. For a fixation in certain positions the bracket arms 7 are provided with braking means 8, which are indicated by a brake-applying lever and by which an unrestrained or unintended movement of the shelf can be prevented.

As is indicated in FIG. 1 the shelf 4 may be provided with handles, secondary supports, means for retaining items placed on the shelf 4, and other accessories 9, so that the manipulation of the shelf 4 is simplified and the field of application of the mount 2 and the space provided by it is increased.

Figure 2:
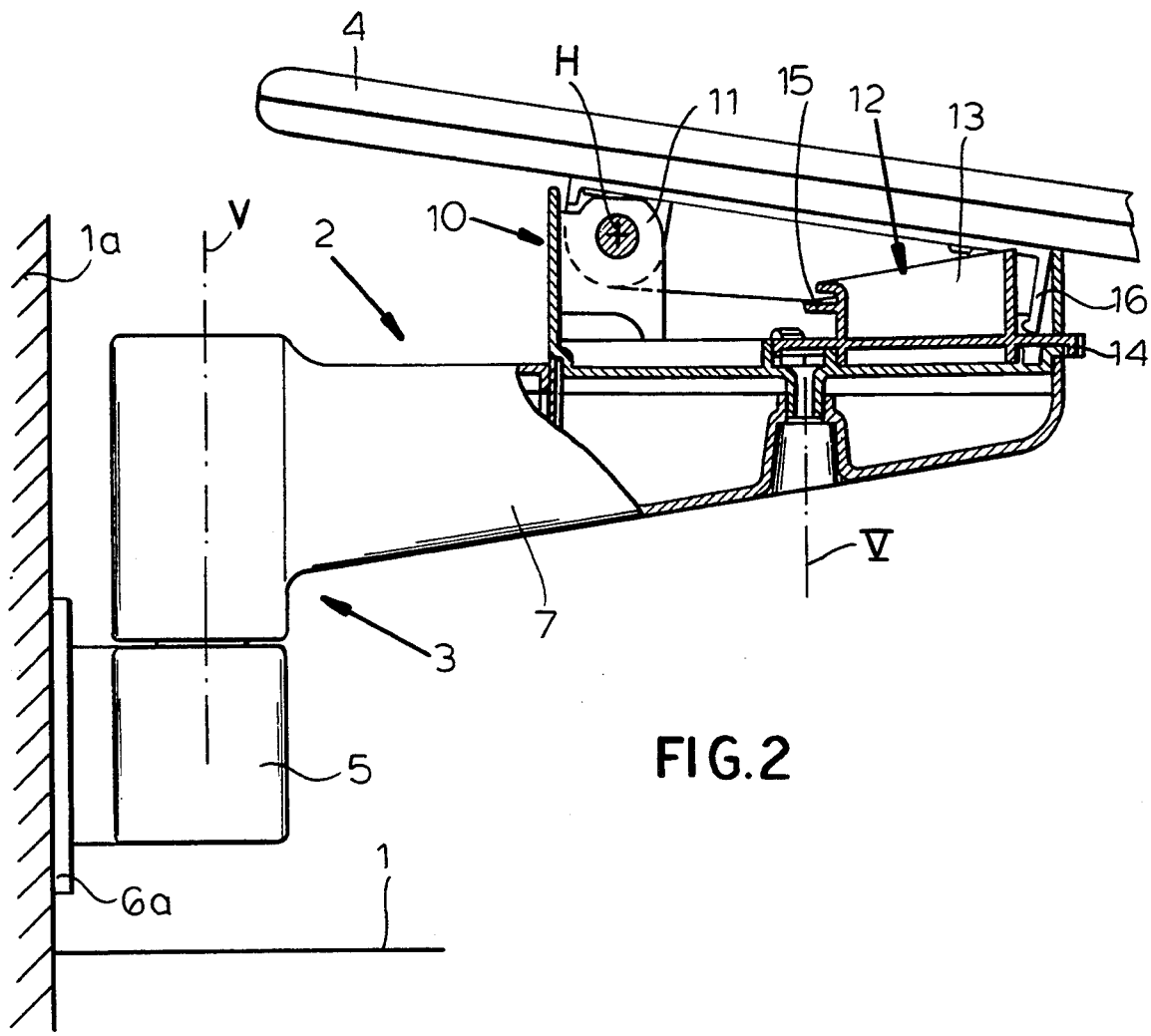
FIG. 2 is a side elevation showing partly in section an embodiment of a wall mount in accordance with the invention adjacent to a desk.

In the illustrative embodiment shown in FIG. 2 each bracket base 5 is provided with a mounting plate 6a, which is secured to a wall 1a adjacent to the desk 1 so that space is saved and the desk can be placed close to the wall. Each bracket arm 7 is provided with a mounting head 10, which comprises a pivot bearing 11. The pivots serve to pivot the bracket arm 7 to the shelf 4 on a common horizontal pivotal axis H. An adjusting drive 12 is provided for an infinite adjustment of the inclination of the shelf. The adjusting drive 12 comprises an adjusting screw 13, which can be rotated by a disk handle 14 and has screw threads 15 in mesh with an adjusting rib 16 of the shelf 4. During a rotation of the adjusting screw 13, the adjusting rib 16 will slide along the screw threads 15 so that the shelf 4 will be swung up or down about the pivot bearings 11 and the inclination of the shelf can thus be changed in such a manner that en appliance placed on the shelf can be operated more conveniently. The mounting head 10 is pivoted to the bracket arm 7 on a vertical axis V so that the fact that the inclination of the shelf 4 can be adjusted will not adversely affect the freedom of the shelf 4 in a direction which is parallel to the desktop.

Figure 3:
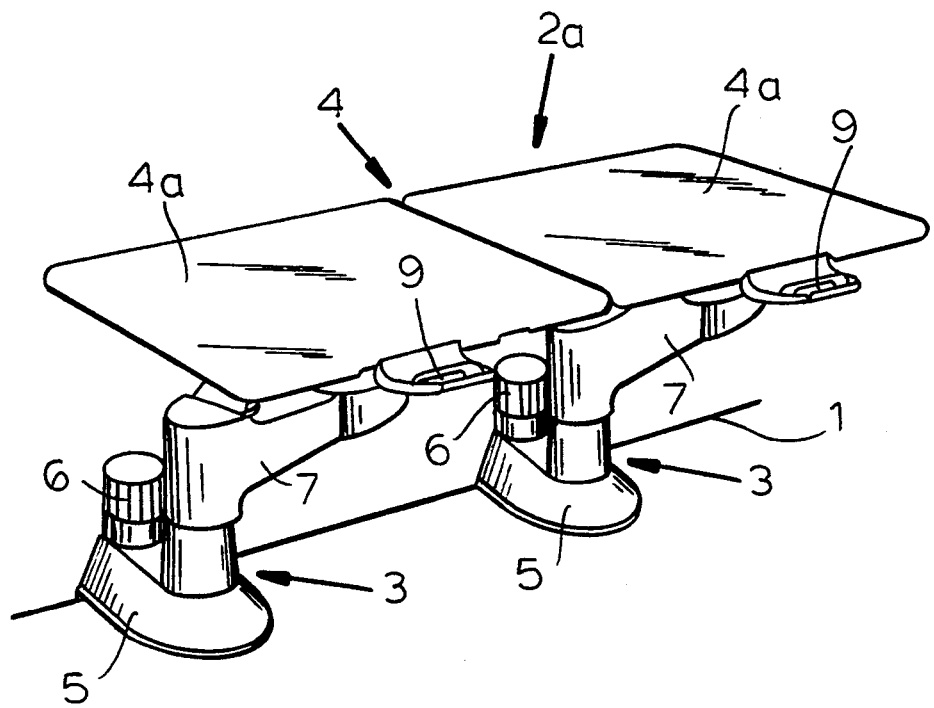
FIGS. 3 and 4 are two perspective views showing a further embodiment of a desktop mount in accordance with the invention viewed in inclined directions from below and above, respectively.
Figure 4:
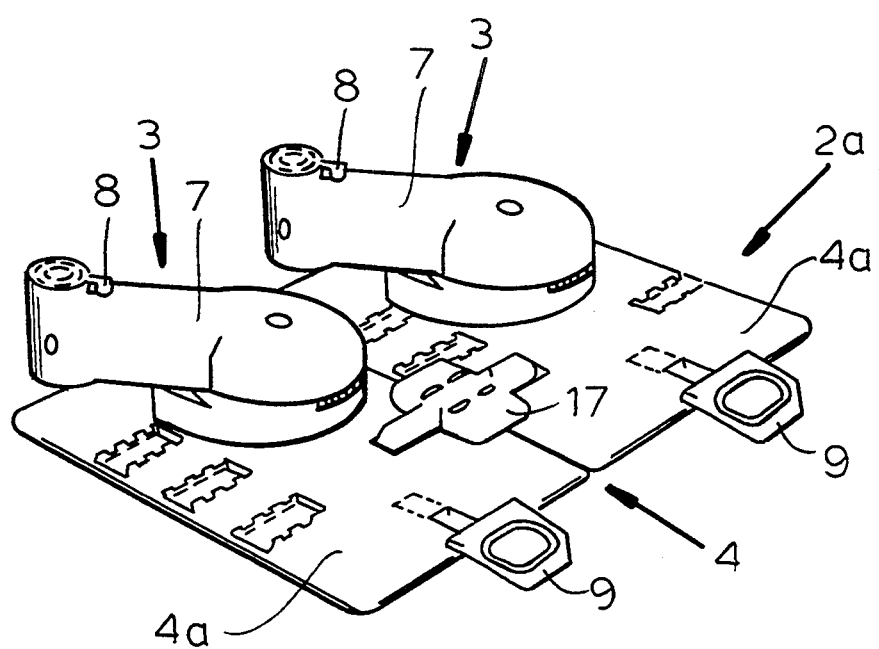

In the illustrative embodiment shown in FIGS. 3 and 4 the shelf 4 is divided into two shelf sections 4a, which are releasably interconnected by connectors 17 or other coupling means. Because each shelf section 4a is mounted on a separate swivel bracket 3, that desktop mount 2a can be used in a great variety of ways. For instance, the shelf 4 may be used as a unit or it may be split and in that case each shelf section 4a may separately be used. Besides, the shelf sections 4a may be interchanged or may be supplemented by other shelves in a manner which is not shown.

Figure 5:
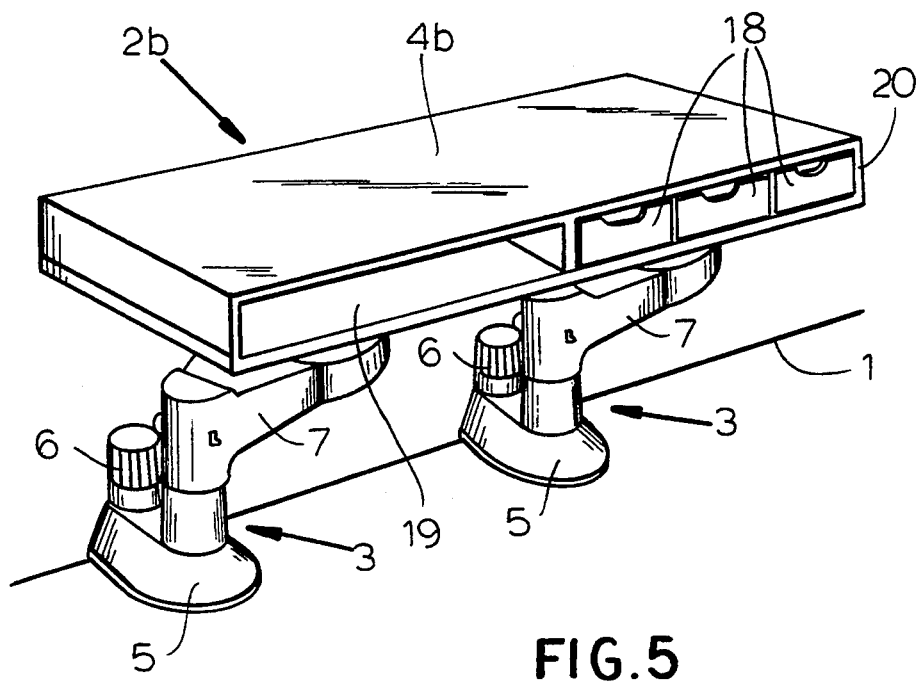
FIG. 5 is a perspective view showing still another embodiment of a desktop mount in accordance with the invention.

In the illustrative embodiment shown in FIG. 5 the desktop mount 2b is provided with drawers 18 and compartments 19, which are accommodated in a box structure 20, the top of which is constituted by the shelf 4b.

Because the shelf of the desktop or well mount in accordance with the invention is supported by two or more swivel brackets, its load-carrying capacity is sufficient for the support of one or more desired office appliances as desired. Owing to the freedom of movement provided by the swivel brackets the appliances placed on the shelf can be moved into the reach of a user with a single manual operation and after use can be pushed to a stand-by position, in which the appliance is outside the usual working space on the desk. On desks provided with the desktop mount the first working level on the desktop will be substantially unrestricted and the second working level can be moved to the most convenient position for operation in case of need.

We claim:

1. A shelf structure for providing a support surface above a desktop, said shelf structure comprising:
   a pair of brackets spaced apart along a desktop and each provided with:
   a base fixedly positionable relative to said desktop and defining a first vertical axis perpendicular to said desktop, and
   an arm swingable about said first axis on said base and having an end spaced from said base and from said first axis, said end defining a second vertical axis perpendicular to said desktop, said arms overhanging said desktop; and
   a single shelf spaced above said desktop and overlying said desktop to form the support surface, said single shelf being mounted on said ends of both said arms to pivot about said second axes, said arms being parallel, said first axes being spaced apart at a respective fixed distance and said second axes being spaced apart at a respective fixed distance, so that said shelf is displaceable parallel to itself above said desktop.

2. The shelf structure defined in claim 1 wherein each of said bases is provided with means for securing the respective base to said desktop.

3. The shelf structure defined in claim 2 wherein said means for securing is a screw clamp.

4. The shelf structure defined in claim 1 wherein each of said bases is provided with means for securing the respective base to a wall above the desktop.

5. The shelf structure defined in claim 1, further comprising a mounting head on each of said ends of said arms, swivelable about the respective second axis and carrying the shelf, said mounting heads defining a horizontal pivot axis about which said shelf is tiltable.

6. The shelf structure defined in claim 5 further comprising an adjusting screw on at least one of said mounting heads to adjust an inclination of said shelf about said horizontal pivot axis.

7. The shelf structure defined in claim 1 wherein said shelf is comprised of a plurality of shelf sections and means for releasably interconnecting said shelf segments.

8. The shelf structure defined in claim 1 wherein at least one of said brackets is provided with a brake for restraining movement of the respective arm.

9. The shelf structure defined in claim 1 further comprising at least one handle on said shelf.

10. The shelf structure defined in claim 1 further comprising means for retaining items supported on said shelf.

11. The shelf structure defined in claim 1 further comprising drawers on said shelf.

12. The shelf structure defined in claim 1 wherein said shelf is provided with compartments.

* * * * *